United States Patent Office 3,035,230
Patented May 15, 1962

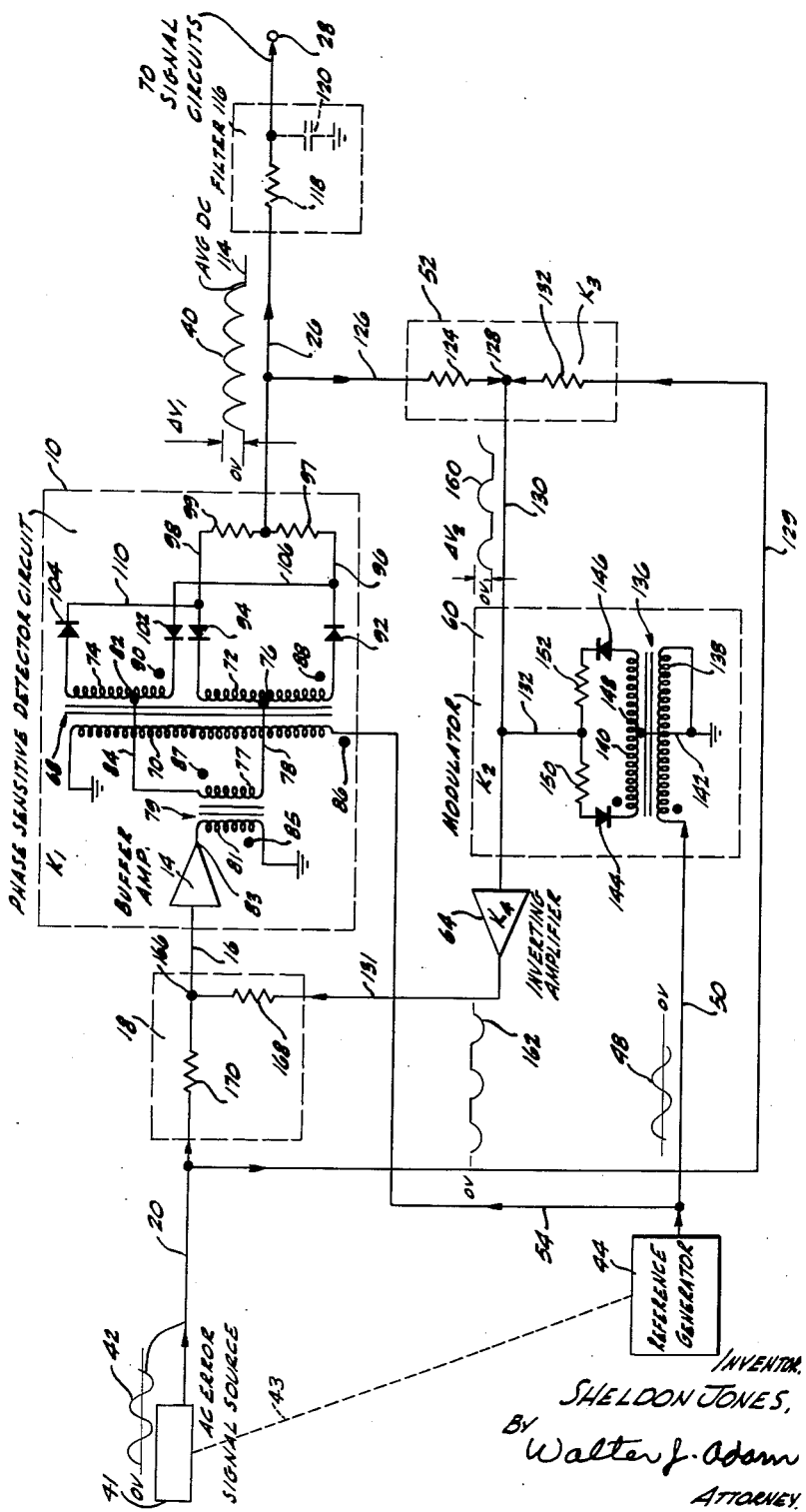

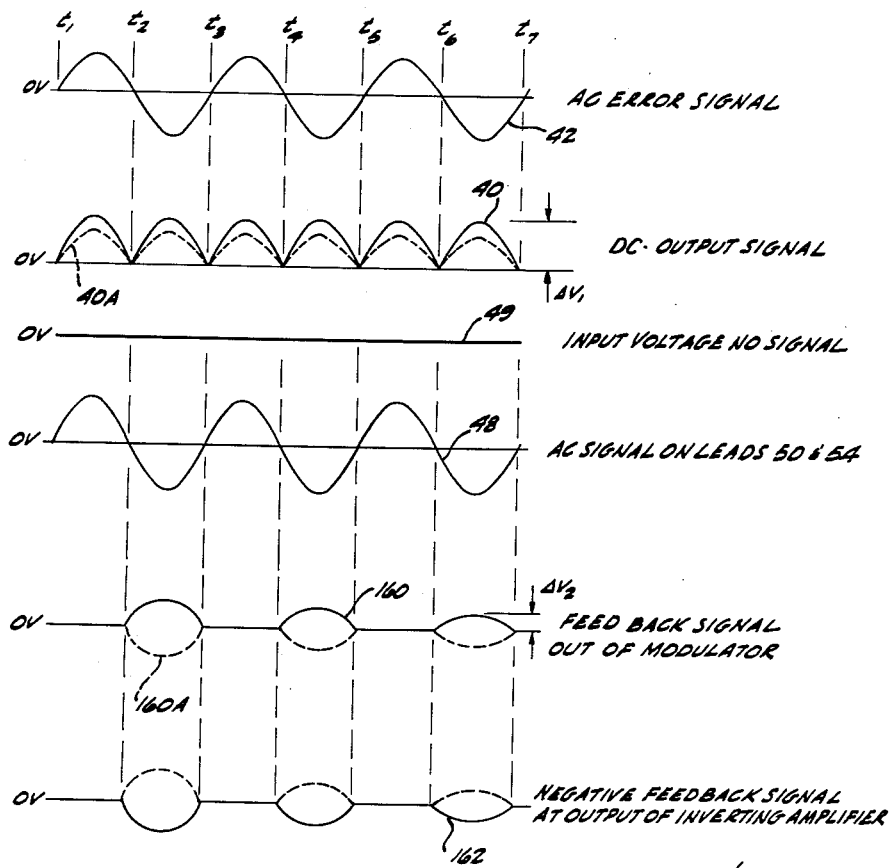
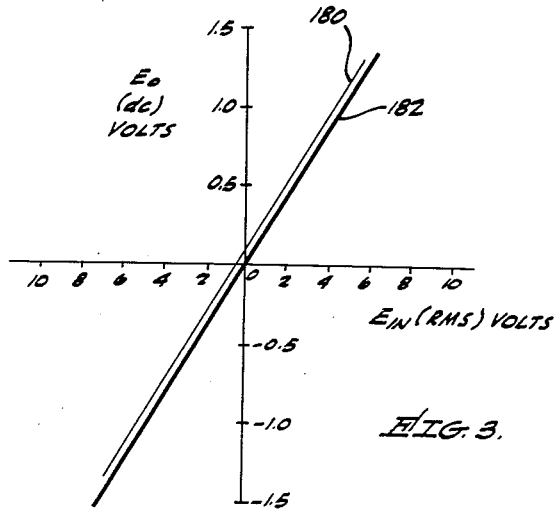

3,035,230
NULL MINIMIZATION CIRCUIT FOR CANCELLING SPURIOUS OUTPUT OF SYNCHRONOUS DETECTOR
Sheldon Jones, Rolling Hills, Calif., assignor to Hughes Aircraft Company, Culver City, Calif., a corporation of Delaware
Filed Mar. 27, 1959, Ser. No. 802,565
13 Claims. (Cl. 329—50)

This invention relates to null cancellation circuits and particularly to a device for maintaining the transfer function of a phase sensitive detector at a desired null reference level.

In the prior art, when using signal transferring devices such as phase sensitive detectors for converting A.C. (alternating current) to D.C. (direct current) signals, the null voltage (output voltage for no input voltage) varies with temperature, output load and the variations of characteristics of the elements of the phase sensitive detector. Since the output voltage level is utilized, for example, in radar to direct an antenna at a target, a variation of the D.C. level caused by a change in the null level provides inaccurate operation of the radar system.

Previous systems which attempt to correct for variations in null reference level may employ an adjustable bias level at the output of the detector for cancelling out the null voltages. This may be adjusted for some of the variations which cause changes in null voltage but temperature and load changes during circuit operation may still change the null level. Also, in system applications many separate adjustments may be required throughout to compensate for an adjustment at the output of the detector. Thus, the prior art adjustment of the null level is difficult to perform and does not provide a reliable null voltage level. A null minimization circuit which would automatically maintain the transfer function of a device, such as a phase sensitive detector, at the desired null level regardless of temperature, load and varying characteristics of the elements in the detector would be very valuable to the art.

An object of this invention, therefore, is to provide a circuit for maintaining the null voltage level of a signal transferring device at a desired constant level during all conditions of operation to provide accurate indications at the output of the device.

It is another object of this invention to provide an improved circuit for maintaining a desired null voltage level across a signal transferring circuit regardless of variation of load, temperature and inherent characteristics in the signal transferring circuit.

It is a further object of this invention to provide a feedback circuit which acts to maintain the transfer function of a detector referenced to a desired null voltage level both when an input signal is present and in the absence of an input signal so as to provide a highly accurate and reliable output signal.

Briefly, the circuit of this invention acts to maintain the null voltage at the output of a high signal level phase sensitive detector at effectively a desired voltage level without affecting the normal operation of the detector. The circuit utilizes a first feedback loop acting as a negative feedback around the phase sensitive detector, which loop acts to reduce the D.C. null voltage by a loop amplification factor. A second feedback loop connected from the input into the first loop provides an A.C. input signal which is summed with the D.C. detected signal to form a null error signal to allow operation when an input signal is present. This error signal is passed to a modulator circuit where it is converted at its low signal level to a pulsating D.C. null signal at the desired frequency and phase relation and is referenced to the desired null voltage level. The null signal is then inverted in the negative feedback loop and summed with the input signal to correct the D.C. null caused by variations of the characteristics of the phase sensitive detector. Thus, the output null is reduced by the negative feedback loop amplification factor and the output null bias is limited to a function of a small reference voltage at the modulator rather than a function of the amplitude of the input signal.

The novel features which are believed to be characteristic of the invention both as to its organization and method of operation, together with the further objects and advantages thereof, will be better understood from the following description considered in connection with the accompanying drawings in which:

FIG. 1 is a schematic circuit diagram showing a null minimization circuit in accordance with this invention;

FIG. 2 is a schematic diagram of waveforms useful in explaining the operation of the circuit of FIG. 1; and FIG. 3 is a graph of input R.M.S. (root mean square) voltage versus output D.C. (direct current) voltage showing the transfer functions of a phase sensitive detector when utilizing the circuit of FIG. 1 and when not utilizing the circuit of FIG. 1.

Referring first to FIG. 1, which shows a schematic circuit diagram of an arrangement in accordance with this invention useful as a null minimization circuit, a phase sensitive detector circuit 10 is shown, which circuit is a signal transferring device controlled by the circuits of this invention. The circuit 10 includes a buffer amplifier 14 with an input lead 16 connected to an input summing means 18, which is in turn coupled to an input lead 20 connected from an A.C. (alternating current) error signal source 41. An output lead 26 from the detector circuit 10 is coupled to an output terminal 28.

The input lead 20 may be connected from the A.C. signal source 4 which provides a signal such as the modulation envelope derived from the amplitude modulation of a radar echo signal caused by signals of a transmitted frequency, as shown by a waveform 42, of a conically scanning radar antenna, as well known in the art. The output terminal 28 may be connected to radar tracking signal circuits (not shown) which utilize a D.C. signal, as shown by a waveform 40, to control the direction of a conical scan antenna.

A reference signal generator 44 is included in the circuit of this invention and may be a conventional conical scan generator utilized with a conical scan antenna to continually develop an A.C. signal as shown by a waveform 48 (FIG. 2). The signal source 41 may be coupled to the reference generator 44 by a suitable mechanical connection 43, which connection may be the conventional coupling between a reference generator of a conical scan antenna and an antenna motor developing the conical scan movement. The signal of the waveform 48 is synchronous in frequency with the input signal of the waveform 42. An output summing means 52, a modulator 60 and an inverting amplifier 64 are also included in the circuit of FIG. 1 as will be described subsequently. The reference generator 44 is connected to the phase sensitive detector circuit 10 by a lead 54 and is connected to the modulator 60 by a lead 50.

The phase sensitive detector circuit 10 will first be described in detail. A transformer 68 is provided which includes an input winding 70 which is mutually coupled to first and second output windings 72 and 74. One end of the input winding 70 is connected to ground and the other end is connected to the lead 54 which in turn is connected to the reference generator 44. The first output winding 72 has a center tap 76 connected to a lead 78 which is in turn series connected to one end of an output winding 77 of an input isolation transformer 79. The second output winding 74 of the transformer 68 has a center tap 82 connected to a lead 84 which is in turn connected to the other end of the output winding 77 of the isolation transformer 79. The windings 70, 72 and 74 may have a polarity relation as shown by the dots 86, 88 and 90 as well known in the art. The isolation transformer 79 also includes an input winding 81 mutually coupled to the output winding 77. One end of the input winding 81 is connected to ground and the other end is connected to the output of the buffer amplifier 14 by a lead 83. The polarity relation of the windings 81 and 77 is shown by the polarity dots 85 and 87, as well known in the art.

One end of the first output winding 72 is connected to the anode of a diode 92 and the other end is connected to the cathode of a diode 94. The cathode of the diode 92 is connected to a lead 96 which in turn is connected to the output lead 26 through a current limiting resistor 97. The anode of the diode 94 is connected to a lead 98 which in turn is connected to the lead 26 through a current limiting resistor 99. One end of the output winding 74 is connected to the cathode of a diode 102 and the other end is connected to the cathode of a diode 104. The anode of the diode 102 is connected to a lead 106 which in turn is connected to the lead 96 between the diode 92 and the resistor 97. The cathode of the diode 104 is connected to a lead 110 which in turn is connected to the lead 98 between the diode 94 and the resistor 99.

These immediately above described elements form a conventional phase sensitive detector as well known in the art. The input signal, similar to the input signal of the waveform 42 is impressed on the input winding 81 of the isolation transformer 79 which signal may vary in amplitude and phase to indicate direction of an antenna (not shown) as discussed above.

A reference signal, as shown by the waveform 48, having a desired phase and frequency is simultaneously impressed on the input winding 70 from the lead 54. Signals of the waveform 48 on the input winding 70 act to cause the detector circuit to cancel all quadrature components, as well known in the art.

The positive half cycle of the input signal of the waveform 42 impressed on the input winding 81 of the transformer 79 causes the center tap 76 to go negative in potential and the center tap 82 to go positive in potential. The diodes 102 and 104 are thus biased out of conduction by the potential at the end of the winding 74. However, the winding 72 goes more positive at its end connected to the anode of the diode 92 and becomes less negative at its end connected to the cathode of the diode 94, to bias the diodes 92 and 94 into conduction. Thus a positive going waveform is impressed through the diode 92 on to the output lead 26 to form a positive pulse of the waveform 40.

When a negative half cycle of the waveform 42 is impressed on the input winding 81 and coupled to the winding 77, a positive potential is impressed on the center tap 76 and a negative potential is impressed on the center tap 82. The diodes 92 and 94 are biased out of conduction during this half cycle. However, the end of the winding 74 connected to the cathode of the diode 102 goes negative and the end connected to the anode of the diode 104 goes positive to bias the diodes 102 and 104 into conduction. Thus the positive potential at the anode of the diode 104 is impressed on the output lead 26 to form another positive pulse of the waveform 40. The amplitude of the pulses of the waveform 40 is determined by the amplitude of the A.C. input signal of the waveform 42. Thus, the phase sensitive detector of the circuit 10 is a full-wave device which acts to form a D.C. signal having an amplitude determined by an A.C. input signal. The D.C. signal of the waveform 40 has an average D.C. value 114 which may be the value utilized by the signal circuits connected to the terminal 28. A filter circuit 116 as shown in the coupling of the lead 26, may be utilized if an average D.C. value is required at this point of the circuit. The filter 116 may include a resistor 118 connected in the lead 26 between the circuit 10 and the terminal 28 with a grounded capacitor 120 connected between the resistor 118 and the terminal 28. Although the operation of the circuit of this invention would be the same with the filter 116, the circuit will be described without this filter, for simplicity of the explanation of the waveforms. Thus the phase detector circuit 10 which may be utilized with this invention has been described.

The null minimization circuitry of this invention as shown in FIG. 1 may now be described. The summing means 52 includes a resistor 124 having one end connected to the output lead 26 by a lead 126 and the other end connected to a summing point 128. Another lead 129 couples the input lead 20 to one end of a resistor 132, the other end being connected to the summing point 128. Thus, the D.C. output signals of the waveform 40 and the A.C. input signal of the waveform 42 are combined at the summing point 128. Also, as will be discussed subsequently, when no input signal is present on the input lead 20, the null level from the lead 26 is passed to the summing point 128. The output path of the summing point 128 is a lead 130 which is connected to the input path of the inverting amplifier 64. The modulator 60 which acts to control the signal at the summing point 128 is connected to the lead 130 by a lead 132. The modulator 60 includes a transformer 136 having a reference input winding 138 and an output winding 140, both mutually coupled. The input winding 138 has one end connected to a ground lead 142 and the other end connected to the lead 50 from the reference generator 44. One end of the output winding 140 is connected to the cathode of a diode 144 and the other end is connected to an anode of a diode 146. A center tap 148 of the output winding 140 is connected to ground through the ground lead 142. The anode of the diode 144 is connected to the lead 132 through a resistor 150 and the cathode of the diode 146 is connected to the lead 132 through a resistor 152.

It is to be noted that the modulator described here is only one of many modulator circuits which may be utilized with this invention. The reference signal of the waveform 48 acts to control the modulator 60.

In operation, a positive pulse of the waveform 48 causes the end of the winding 140 which is connected to the anode of the diode 146 to go negative in potential and the end which is connected to the cathode of the diode 144 to go positive in potential. Thus, during a positive half cycle of the reference signal of the waveform 48, the diode 144 and 146 are biased out of conduction and an error signal, as shown by a positive pulse of the waveform 160, is formed on the lead 130. As will be described in detail subsequently, the error pulse of the waveform 160 may be either positive or negative. During a negative half cycle of the reference signal of the waveform 48, the end of the winding 140 connected to the anode of the diode 146 goes positive and the end connected to the cathode of the diode 144 goes negative due to the polarity relations of the windings. Thus, the diodes 144 and 146 are biased into conduction and the summing point 128 and the lead 130 are grounded to form the ground level portion of the waveform 160. During alternate half cycles, when the error signal of the waveform 160 is grounded, a correct error signal would not have been formed at the summing point 128. The modulator 60 acts continuously in response to the signal of the waveform 48. It is to be noted that the output impedance of the summing means 52 is provided both by the modulator 60 and by the action of the inverting amplifier 64.

The inverting amplifier 64 receives the error signal of a waveform 160 on the lead 130 and develops the inverted and amplified error signal of a waveform 162 on the lead 131. The inverting amplifier 64 is well known and will not be explained in detail.

The input summing means 18 includes an input summing point 166 in the lead 16. The input summing means 18 also includes a resistor 168 connected between the summing point 166 and the lead 131 and a resistor 170 connected between the summing point 166 and the input lead 20. The buffer amplifier 14 is connected between the lead 16 and the lead 83 to provide a high impedance at the output of the input summing means 18 so as to form an output impedance for the summing action. The buffer amplifier 14 may be a conventional cathode follower circuit, as is well known in the art. Thus, the inverted error signal of the waveform 162 and the input signal of the waveform 42 are combined in the input summing means 18.

Referring now to FIG. 2 which shows a schematic diagram of waveforms as well as to FIG. 1, the operation of this invention will be explained in further detail. As discussed previously, this circuit operates both during the presence of an input signal and in the absence of an input signal. When an input signal as shown by the waveform 42 is impressed on the input lead 20 the phase sensitive detector circuit 10 acts to develop the D.C. signal of the waveform 40 on the lead 26 and the output terminal 23. At the same time, the input signal of the waveform 42 and the D.C. signal of the waveform 40 are combined in the summing means 52 by the action of the resistors 124 and 132 and the combined impedance looking into the modulator 60 and the inverting amplifier 64, as is well known in the art. Thus, an error signal as shown by the waveform 160 is formed. The action of the modulator 60 in response to the reference signal of the waveform 48 causes the signal of the waveform 160 to be grounded once during each cycle, that is, between $t_1$ and $t_2$, $t_3$ and $t_4$, and between $t_5$ and $t_6$. During these periods, the signals of the waveforms 40 and 42 would add positively if allowed to combine, which condition would not represent the error difference as required. During the periods between the times $t_2$ and $t_3$, $t_4$ and $t_5$ and between $t_6$ and $t_7$ the signal of the waveform 42 is negative and the error modulations of the D.C. signal of the waveform 40 are positive so that they subtract in the summing means 52. The waveform 160 is shown positive resulting from the waveform 40 being of a greater amplitude than the waveform 42. This increase in amplitude of the D.C. signal may be caused by temperature or load changes as discussed previously. It is to be noted that the D.C. output signal may be less than the input signal of the waveform 42 as shown by the dotted waveform 40a, thus forming a negative error signal as shown by the dotted negative signals of a waveform 160a. Also the amplitude of the D.C. signal of the waveform 40 and of the waveforms 160 and 162 may vary in response to phase changes of the signal of the waveform 42 during the intervals such as between times $t_2$ and $t_3$ as defined by the phase condition of the reference signal of the waveform 48. The phase of the signal of the waveform 42 may vary, for example, when the direction of a radar target changes relative to the axis of a conical scan antenna. Therefore, the amplitudes of the input signal and the D.C. signal are compared in the summing means 52 and any difference appears in the error signal of the waveform 160 during each alternate half cycle. Thus there is an A.C. and a D.C. signal summation in the summing means 52 to form a low level error signal of the waveform 160. It is to be noted that the error signal of the waveform 160 is subjected to inaccuracies, such as temperature changes, only from the modulator 60 which is a low level signal device when compared to the phase sensitive detector circuit 10. Since null errors are primarily a percentage of the signal amplitude, the null error is greatly minimized in the modulator 60 because the signal controlled by the modulator 60 is relatively small, that is, reduced by the loop gain of the inverting amplifier 64. The majority of the loop gain is provided by the inverting amplifier 64 to form the inverted error signal of the waveform 162. Thus, the circuit acts as a negative feedback circuit to invert the error signal so as to correct the null error on the lead 26 by summing the inverted error signal of the waveform 162 with the input signal of the waveform 42 in the input summing means 18. The error at the output lead 26 is corrected in a short period so that the error signal of the waveform 160 is maintained at a minimum amplitude as shown between times $t_6$ to $t_7$.

When no input signal such as shown by the waveform 42 is being passed to the circuit from the input lead 20, a D.C. signal as shown by a waveform 49 is present at the input lead 20 and on the lead 129. However, because of the action of the reference signal of the waveform 48, the D.C. signal derived from the phase sensitive detector circuit 10 has modulations similar to the waveform 40. Thus this D.C. signal forms an error signal similar to the waveform 160 which is inverted to maintain the desired null error level on the output lead 26. Since the D.C. signal of the waveform 49 is at the null voltage level of ground, for example, it does not contribute to the error signal in the summing means 52 and the circuit provides only a negative feedback action. Note that the loop of the lead 130 and the summing means 52 allows the system to operate in the presence of an input signal such as the waveform 42 since without this arrangement including the lead 130, a signal would cause the negative feedback action to maintain a null on the lead 26 until saturation of the inverting amplifier 64. In the absence of an input signal, the output error is also limited to small variations of the modulator 60.

Referring now to FIGS. 1 and 2, some further details may be given of the operation of the circuit in accordance with this invention.

Mathematically, the operation of the circuit may be expressed as:

$$E_0 = E_{in}\frac{(1+k_2 k_3 k_1)}{1+k_1 k_2 k_4}k_1 + \frac{\Delta V_1}{1+k_1 k_2 k_4} - \frac{\Delta V_2 k_1}{1+k_1 k_2 k_4}$$

where:

$E_0$ = the average D.C. output voltage 114 as shown at the waveform 40

$E_{in}$ = RMS voltage of the A.C. input signal $\Delta V_1$ = the instantaneous null voltage of the waveform 40

$\Delta V_2$ = the instantaneous null error voltage of the waveform 160 resulting from summing the signals of the waveform 42 and 40 and the modulator null voltage $\Delta V_2$ is less than $\Delta V_1$ by approximately the loop gain determined primarily by the inverting amplifier 64

$k_1$ = overall amplification factor of the phase sensitive detector circuit 10

$k_2$ = overall amplification factor of the modulator circuit 60

$k_3$ = overall amplification factor between the lead 130 and the summing point 128, determined principally by the summing means 52

$k_4$ = overall amplification factor of the inverting amplifier 64

By making $k_1=k_3$ and $k_1k_2k_4 \gg 1$ this equation reduces to:

$$E_0 = E_{in}k_1 + \frac{\Delta V_1}{k_1k_2k_4} - \frac{\Delta V_2}{k_2}$$

By inspection, this equation says that the bias voltage $V_1$ (the bias due to the phase sensitive detector) is divided by the loop gain $k_1k_2k_4$, and that a new bias term $\Delta V_2$ (the bias resulting from the low level modulator 60) has been introduced.

$$\frac{\Delta V_2}{k_2}$$

is the voltage required to give the desired zero output from the modulator 60. This voltage is small since the output of the amplifier 64 is only required to be greater than $$\frac{\Delta V_1}{k_1}$$

to provide a negative feedback corrective action. Therefore the range of signal that the modulator 60 is required to handle is $$\frac{\Delta V_1}{k_1k_2k_4}$$

Theoretically, this expression can be made as small as desired by increasing $k_1$, $k_2$ and $k_4$ in the design of the circuit elements, but practical limitations show that there is a very small irreducible modulator null on the output lead 26.

Now referring to FIG. 3, which shows a graph of input voltage versus output voltage, the overall action of this circuit may be understood. One curve 180 shows the transfer function across a phase sensitive circuit without the null minimization circuit of this invention. A second curve 182 shows the transfer function across the phase sensitive detector utilizing the circuits of this invention as seen in FIG. 1. Thus the second curve 182 shows that this invention maintains the output D.C. signal referenced to a desired null level of zero volts, for example, during the presence of an input signal, and in the absence of an input signal acts to maintain the output null level at the desired level.

Thus there has been described a null minimization circuit which utilizes two loops to operate either with or without an A.C. input signal to maintain a desired output null level. A null error resulting from the low level signal device, the modulator, is substituted for the null error from the high level signal detector device. The null error resulting from the phase sensitive detector is divided by the loop gain. The circuit of this invention provides a highly accurate and reliable signal converting system to provide a desired transfer function regardless of temperature and load changes and variations of the characteristics of the elements in the circuit.

What is claimed is:

1. A device for reducing the relative output null voltage error across a signal converting means as the operating characteristics of said signal converting means vary, said signal converting means having an input for receiving a large amplitude alternating input signal from a source and having an output on which is developed an output signal, said device comprising a first summing means coupled between said output and said source to combine said input and output signal to form an error signal, a second summing means coupled between said source and said output, a modulator coupled to said first summing means, synchronized with said alternating input signal and having a reference source of a desired null voltage, said modulator acting to connect said reference source to said first summing means to control said error signal during alternate half cycles of said alternating input signal, and an inverting amplifier coupled between said first and second summing means for inverting and amplifying the converted error signal to act as a negative feedback signal in said second summing means and to reduce the null voltage error at said output by correcting said input signal.

2. A circuit for reducing the null voltage at the output of a signal transferring circuit which acts to develop D.C. output signals from A.C. input signals, said circuit comprising a negative feedback loop connected from the output to the input of the signal transferring circuit and including a summing point and a modulator connected to said summing point, an additional coupling from the input of the signal transferring circuit to the summing point to supply a portion of the input signal to the summing point, means coupled to the modulator to synchronize the modulator with the input signal to sum only alternate half cycles of said D.C. and A.C. components so as to form a rectified error signal, and inverting means coupled in said negative feedback loop between said summing point and the input of said signal transferring circuit so as to invert said error signal and vary the A.C. input signal so as to correct the null voltage at the output of the signal transferring circuit.

3. A means for maintaining a desired null reference voltage at the output of a signal converting device which forms direct current output signals from alternating current input signals, said circuit comprising a first summing point coupled to the output of said converting device and to the input of said converting device, a modulator coupled to said first summing point, synchronized with the input signal and referenced to a source of said desired null reference voltage for connecting said first summing point to said source during alternate half cycles of said input signals, a second summing point coupled to said input of said converting device, and an inverting amplifier coupled between said first and second summing points, whereby said input signal is corrected to maintain the output signal referenced to said desired null reference voltage.

4. A signal processing circuit for adjusting a null voltage resulting from a high amplitude level signal controlling device to the null voltage resulting from a low amplitude level signal controlling device, said high amplitude signal controlling device having an input and an output, said circuit comprising a first summing means connected to the output and to the input, a low level modulator coupled to said first summing point to develop a low amplitude level error signal at said first summing means, a second summing means coupled to the circuit input, and an inverting amplifier coupled between said first and second summing means for developing an amplified inverted error signal to pass to said second summing means for maintaining a null voltage at the circuit output as determined by said low level modulator.

5. A null minimization circuit comprising a phase sensitive detector having an input and having an output to be referenced to a desired null reference level, an input source of a high amplitude A.C. input signal, a first summing means, the first summing means being coupled to the output with a first signal path and being coupled to said source with a second signal path, a second summing means coupled between said source and the input of said detector, modulator means coupled to the output of said first summing means and being synchronized with the A.C. input signal and referenced to a source of the desired null reference level, and inverting amplifier means coupled between the output of said first summing means and said second summing means, said second summing means acting to combine an inverted and amplified signal from said amplifier means and said input signal to maintain the null reference level at the output of said detector substantially at said desired null reference level of said modulator means.

6. A device for reducing the relative output null voltage error across a signal converting means as the operating characteristics of said signal converting means vary, said signal converting means having an input for receiving a large amplitude alternating input signal from a source and having an output on which is developed an output signal, said device comprising a first summing means coupled between said output and said source to combine said input and output signal to form an error signal, a second summing means coupled between said source and said input, an error signal converting means coupled to said first summing means to convert the error signal to have the frequency characteristics of the input signal, and an inverting amplifier coupled between said first and second summing means for inverting and amplifying the converted error signal to act as a negative feedback signal in said second summing means and to reduce the null voltage error at said output by correcting said input signal.

7. A null minimization circuit for correcting to a desired null voltage the null voltage level at the output of a phase sensitive detector which acts to receive a high level A.C. input signal from a source and to develop a D.C. signal at an output, the circuit comprising first and second resistors, a first summing point coupled to said output through said first resistor and coupled to said source through said second resistor to combine the input and output signals to form an error signal, a modulator having an output coupled to said first summing point for modulating the error signal in synchronism with the A.C. input signal to form a rectified error signal referenced to a source of the desired null voltage, third and fourth resistors, a second summing point coupled to said source through said third resistor, coupled to said input of said phase detector and coupled to one end of said fourth resistor, and an inverting amplifier coupled between said first summing point and the other end of said fourth resistor for inverting and amplifying the rectified error signal to be combined with the A.C. input signal at said second summing point so as to adjust the null voltage level at the output of said phase detector to vary from the desired null voltage only by a low level null voltage developed across said modulator.

8. A null minimization circuit for maintaining the transfer function between the input and output of a phase sensitive detector referenced to a desired null level, said detector receiving an A.C. signal from a source and acting to develop a D.C. signal at its output, said circuit comprising a first summing means having a first input coupled to said output and a second input coupled to said source for forming an error signal at an output, a modulator coupled to the output of said summing means for rectifying said error signal and including means for synchronizing the modulation action with the A.C. input signal, said modulator acting to reference the error signal to the desired null level, a second summing means having a first input coupled to said source, an output coupled to the input of said detector and having a second input, and an inverting amplifier coupled between the output of said first summing means and said second input of said second summing means to develop a negative feedback signal to be summed with the A.C. input signal so as to maintain said transfer function referenced to said null reference level of said modulator.

9. A circuit for maintaining the transfer function of a detector circuit at a desired null signal level, said detector circuit having an input and an output with said input coupled to a source of A.C. input signals and acting to form D.C. output signals, said circuit comprising a first summing means having inputs and an output, said inputs coupled to the output of said detector circuit and to said source for combining the D.C. output and the A.C. input signal to form an error signal, a second summing means including first and second inputs and an output, the first input and the output of said second summing means coupled respectively between said source and the input of said detector circuit, a modulator coupled to the output of said first summing means for rectifying the error signal with a reference level at the desired null level, said modulator being synchronized with said input signal, and an inverting amplifier coupled between the output of said first summing means and the second input of said second summing means to invert and amplify the rectified error signal, to thereby continuously maintain the transfer function at the desired null level as determined by said modulator.

10. A circuit for reducing the null reference voltage from a percentage of a high level signal having a large variation in amplitude from a given reference to a percentage of a low level signal having a small variation in amplitude from a given reference, comprising a high level device for converting an alternating high level input signal received from a source to a direct current output signal, a first summing means coupled between the input and the output of said high level device for summing said input and said output signal, a second summing means coupled between said source and said input of said high level device to develop an error signal, a low level signal device which operates with said low level signal, coupled to the output of said first summing means and including a reference voltage source, said device acting during alternate half cycles of said input signal connecting the reference voltage to said first summing means to maintain said error signal at the reference voltage during said alternate half cycles, and an inverting amplifier coupled between said output of said first summing means and said second summing means to invert and to amplify the error signal to form a negative feedback signal to be combined with said input signal in said second summing means and to correct the null reference voltage at the output of said high level device to a percentage of error as determined by said low level device.

11. A null minimization device for maintaining a desired zero output voltage reference level at the output of a signal converting device acting to receive an A.C. input signal at the input thereof from a source of input signals and to develop a D.C. output signal, comprising a first summing means coupled between the source and the input of the signal converting device, a loop coupled between the output of said converting device and said first summing means, said loop including a second summing means at its end connected to the output of said signal converting device and an inverting amplifier at its end coupled to said first summing means, said source coupled to said second summing means for supplying said input signal so said second summing means can compare said input signal and said output signal to form an error signal, and an error signal controlling means including a zero reference voltage source coupled to said second summing means to connect the error signal to said reference source during each alternate half cycle of said A.C. input signal so as to have frequency characteristics similar to the input signal, said first summing means responding to the inverted error signal after passing through said inverting amplifier to correct said input signal to maintain said zero output reference level.

12. A device for maintaining a desired null reference voltage between the input and the output of a signal converting means acting to receive an input signal and to form an output signal comprising a first summing means coupled between said input and output for summing said input and output signals to form an error signal, a second summing means coupled between said input and said first summing means, an error signal converting means coupled between said first and second summing means for converting the error signal to have alternating characteristics consistent with said input signal and for rectifying the error signal, and an inverting amplifier coupled between said error signal converting means and said second summing means to amplify and invert the converted error signal so as to control the input signal to maintain the desired null reference voltage.

13. A null minimization circuit including a signal converting device having an input and an output, said circut acting in response to an input signal applied from a source of input signals to control the output signal so as to be referenced to a desired null voltage level and acting in the absence of an input signal to maintain the output signal at a desired null voltage, said circuit comprising a loop coupled between the input and output of the converting device for controlling the output null voltage in the absence of an input signal, said loop including a first summing means at the end of the loop connected to said output, a second summing means at the end of the loop connected to said input and an inverting amplifier coupled in said loop between said first and second summing means, and modulator means coupled to said first summing means, the source coupled to said first summing means for controlling the output reference voltage in the presence of an input signal, whereby said loop acts as a negative feedback circuit to maintain a null voltage in the absence of an input signal, and in the presence of an input signal said loop acts with the signals applied to said first summing means from said source to combine the input signal with said output signal to maintain said output signal reference to said desired null voltage.

No references cited.